US012236870B2

(12) United States Patent
Yu et al.

(10) Patent No.: US 12,236,870 B2
(45) Date of Patent: Feb. 25, 2025

(54) PIXEL CIRCUIT AND DRIVE METHOD THEREOF, DISPLAY PANEL, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Ziyang Yu, Beijing (CN); Zhiliang Jiang, Beijing (CN); Ming Hu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,522

(22) PCT Filed: Apr. 18, 2022

(86) PCT No.: PCT/CN2022/087418
§ 371 (c)(1),
(2) Date: Mar. 25, 2023

(87) PCT Pub. No.: WO2023/201470
PCT Pub. Date: Oct. 26, 2023

(65) Prior Publication Data

US 2024/0304142 A1 Sep. 12, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861; G09G 2310/08; G09G 2320/0233
See application file for complete search history.

(56) References Cited

U.S. PATENT DOCUMENTS

| | | | | |
|---|---|---|---|---|
| 11,222,587 B2 * | 1/2022 | Toyomura | ............ | G09G 3/3233 |
| 2003/0142052 A1 * | 7/2003 | Matsumoto | .......... | G09G 3/3648 345/87 |

(Continued)

FOREIGN PATENT DOCUMENTS

| | | |
|---|---|---|
| CN | 210837108 U | 6/2020 |
| CN | 111383600 A | 7/2020 |

(Continued)

*Primary Examiner* — Mihir K Rayan
(74) *Attorney, Agent, or Firm* — Ling Wu; Stephen Yang; Ling and Yang Intellectual Property

(57) ABSTRACT

Disclosed is a pixel circuit including a drive sub-circuit, a writing sub-circuit, a reset sub-circuit, a coupling sub-circuit, a storage sub-circuit, and a light emitting element, wherein the drive sub-circuit is configured to provide a drive current to the light emitting element under control of signals of a first node and a second node; the writing sub-circuit is configured to write a signal of a data signal terminal to the second node under control of a signal of a scan signal terminal; the coupling sub-circuit is configured to raise the voltage of the first node through a coupling action; the reset sub-circuit is configured to reset an anode terminal of the light emitting element under control of a signal of the scan signal terminal and reset a control terminal of the drive sub-circuit under control of a signal of a reset control signal terminal.

19 Claims, 8 Drawing Sheets

(52) U.S. Cl.
CPC . *G09G 2300/0861* (2013.01); *G09G 2310/08* (2013.01); *G09G 2320/0233* (2013.01)

(56) References Cited

U.S. PATENT DOCUMENTS

| | | | | |
|---|---|---|---|---|
| 2016/0124491 | A1* | 5/2016 | An | G06F 1/3265 713/323 |
| 2017/0365218 | A1* | 12/2017 | Jeong | G09G 3/3258 |
| 2019/0295469 | A1 | 9/2019 | Umezawa et al. | |
| 2020/0327852 | A1 | 10/2020 | Ji et al. | |
| 2022/0044634 | A1 | 2/2022 | Ka et al. | |
| 2022/0208084 | A1 | 6/2022 | Jeong | |
| 2022/0319411 | A1 | 10/2022 | Cheng et al. | |

FOREIGN PATENT DOCUMENTS

| | | | |
|---|---|---|---|
| CN | 111640397 | A | 9/2020 |
| CN | 111724733 | A | 9/2020 |
| CN | 112447140 | A | 3/2021 |
| CN | 112951854 | A | 6/2021 |
| CN | 113362765 | A | 9/2021 |
| CN | 113678190 | A | 11/2021 |
| CN | 114067749 | A | 2/2022 |
| CN | 114258320 | A | 3/2022 |
| CN | 114299859 | A | 4/2022 |
| CN | 114930544 | A | 8/2022 |

* cited by examiner

PIXEL CIRCUIT AND DRIVE METHOD THEREOF, DISPLAY PANEL, AND DISPLAY APPARATUS

CROSS-REFERENCE TO RELATED APPLICATION

The present application is a U.S. National Phase Entry of International Application No. PCT/CN2022/087418 having an international filing date of Apr. 18, 2022. The entire contents of the above-identified application are hereby incorporated by reference.

TECHNICAL FIELD

Embodiments of the present disclosure relate to, but are not limited to, the field of display technologies, in particular to a pixel circuit and a drive method thereof, a display panel, and a display apparatus.

BACKGROUND

An Organic Light Emitting Diode (OLED) is an active light emitting display device having advantages of self-luminescence, a wide viewing angle, a high contrast ratio, low power consumption, an extremely high response speed, etc., and has been widely used in display products such as a mobile phone, a tablet computer, and a digital camera. OLED display is current-driven, and requires a current to be output to an OLED through a pixel circuit to drive the OLED to emit light.

SUMMARY

The following is a summary of subject matters described herein in detail. The summary is not intended to limit the protection scope of claims.

An exemplary embodiment of the present disclosure provides a pixel circuit including a drive sub-circuit, a writing sub-circuit, a reset sub-circuit, a coupling sub-circuit, a storage sub-circuit, and a light emitting element, wherein the drive sub-circuit is configured to provide a drive current to the light emitting element under control of signals of a first node and a second node; the writing sub-circuit is configured to write a signal of a data signal terminal to the second node under control of a signal of a scan signal terminal; the storage sub-circuit is configured to store a voltage of the first node; the coupling sub-circuit is configured to raise the voltage of the first node through a coupling action; the reset sub-circuit is configured to reset an anode terminal of the light emitting element under control of a signal of the scan signal terminal and reset a control terminal of the drive sub-circuit under control of a signal of a reset control signal terminal.

An exemplary embodiment of the present disclosure also provides a display panel, and the display panel includes multiple sub-pixels, wherein at least one of the sub-pixels includes the pixel circuit according to any embodiment of the present disclosure.

An exemplary embodiment of the present disclosure also provides a drive method of a pixel circuit, which is used for driving the pixel circuit according to any embodiment of the present disclosure, and the drive method includes: resetting, by a reset sub-circuit, a first node and a fourth node under control of signals of a reset control signal terminal and a scan signal terminal; writing, by a writing sub-circuit, a signal of a data signal terminal to a second node under control of a signal of the scan signal terminal; storing, by a storage sub-circuit, a voltage of the first node; raising, by a coupling sub-circuit, the voltage of the first node through a coupling action; and providing, by a drive sub-circuit, a drive current to a light emitting element under control of signals of the first node and the second node.

An embodiment of the present disclosure also provides a display apparatus including a display panel and a photosensitive element, the display panel includes a first display region and a second display region, the first display region at least partially encloses the second display region, and the photosensitive element is located in the second display region; the display panel further includes multiple pixel circuits and multiple first light emitting elements located in the first display region; the multiple pixel circuits include: multiple first pixel circuits and multiple second pixel circuits, the multiple second pixel circuits are distributed among the multiple first pixel circuits, and at least one pixel circuit in the multiple first pixel circuits is connected with at least one light emitting element in the multiple first light emitting elements; the display panel further includes multiple second light emitting elements located in the second display region; at least one pixel circuit in the multiple second pixel circuits is connected with at least one light emitting element in the multiple second light emitting elements; and a second pixel circuit is the pixel circuit according to any embodiment of the present disclosure.

Other aspects may be comprehended upon reading and understanding drawings and detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
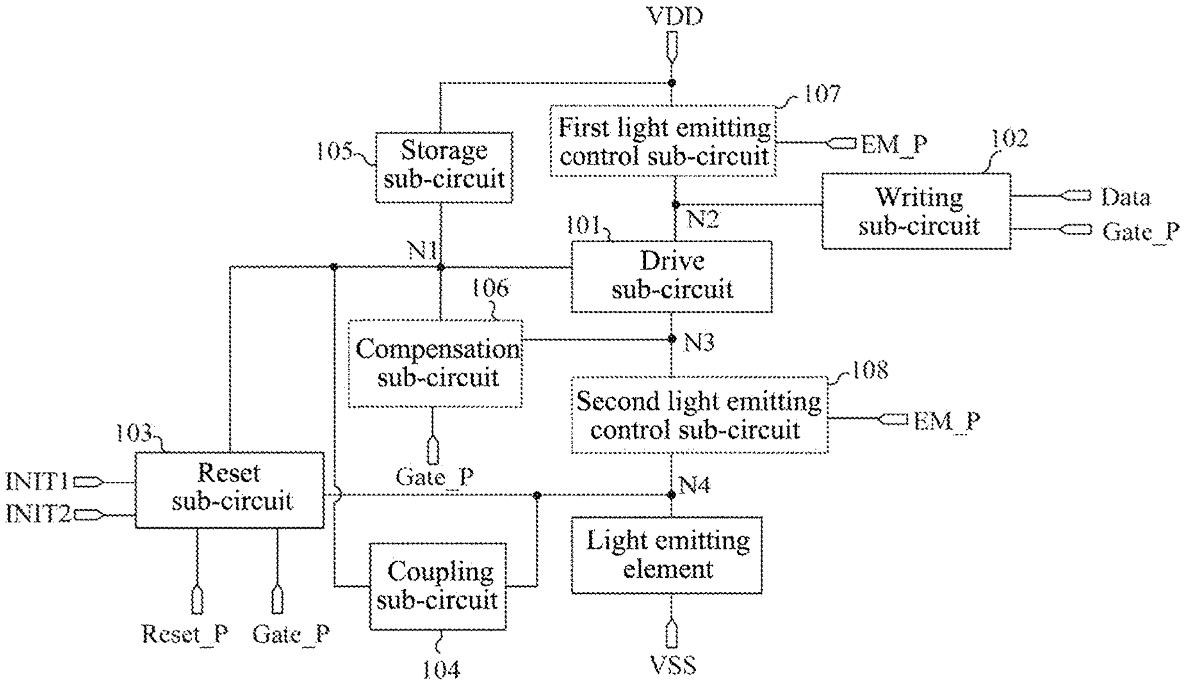
FIG. 1 is a schematic diagram of a structure of a pixel circuit according to an embodiment of the present disclosure.

The embodiments of the present disclosure will be described in detail below with reference to the drawings. It is to be noted that implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

Unless otherwise defined, technical terms or scientific terms publicly used in the embodiments of the present disclosure should have usual meanings understood by those of ordinary skill in the art to which the present disclosure belongs. "First", "second", and similar words used in the embodiments of the present disclosure do not represent any order, quantity, or importance, but are only used for distinguishing different components. "Include", "contain", or a similar word means that an element or object appearing before the word covers an element or object listed after the word and equivalent thereof and does not exclude another element or object.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, a first electrode may be a source electrode, and a second electrode may be a drain electrode. In a case that transistors with opposite polarities are used, in a case that a direction of a current is changed during operation of a circuit, or the like, functions of the "source electrode" and the "drain electrode" are sometimes interchangeable. Therefore, the "source electrode" and the "drain electrode" are interchangeable in the specification.

In this specification, a "connection" includes a case where constitute elements are connected together through an element with some electrical effect. The "element with some electrical effect" is not particularly limited as long as electrical signals may be sent and received between the connected constituent elements. Examples of the "element with some electrical effect" not only include electrodes and wirings, but also include switching elements such as transistors, resistors, inductors, capacitors, other elements with various functions, etc.

An OLED display apparatus has many advantages such as self-luminescence, a low drive voltage, a high light emitting efficiency, a short response time, and a wide use temperature range, and is commonly recognized as a most promising display apparatus. OLED pixels need to be driven by a current to emit light, while a camera usually needs to be provided in a display region of a mobile display device such as a mobile phone to meet different photo application scenarios. The camera in the display region needs to capture light that penetrates through the display region to reach a lens, so there is a great demand for a penetration rate of the display region. In order to achieve a true full-screen display, a mode of externally disposed pixel circuit+transparent trace is usually adopted, and Backplane (BP) drive pixels are disposed externally in a non-Full Display with Camera (non-FDC) region, and a drive signal is transmitted to an FDC region through the transparent trace to drive an anode in the FDC region and an OLED device to emit light.

However, the transparent trace is too long and a load is relatively large in the FDC region, resulting in that a drive current of the pixel circuit at high frequency or low gray scale is relatively small and a voltage of the anode of an OLED cannot be charged quickly to a predetermined value, and the OLED device lights up slowly, resulting in that pixels in the FDC region are generally darker than those in the non-FDC region; at the same time, due to a difference in light emitting currents of R/G/B pixels, G pixels light up the slowest compared with R/B pixels under same brightness, which leads to a purple picture in the FDC region. If a gray scale is lower and a drive frequency is higher, the picture becomes more purple and darker.

Figure 2:
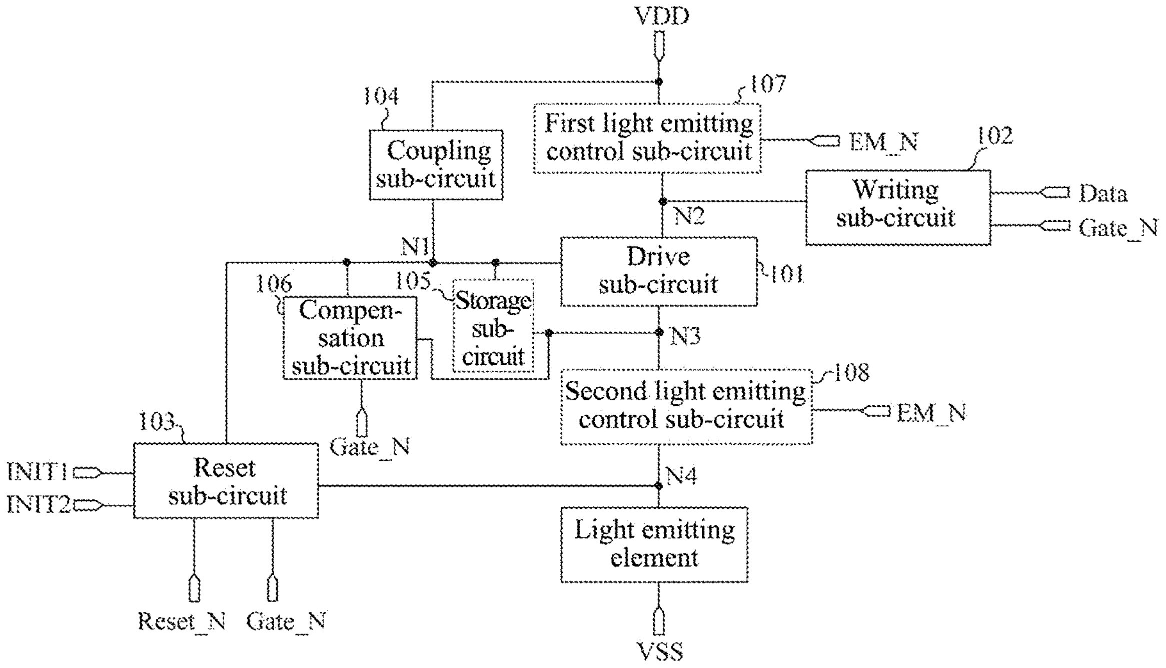
FIG. 2 is a schematic diagram of a structure of another pixel circuit according to an embodiment of the present disclosure.

An embodiment of the present disclosure provides a pixel circuit. FIGS. 1 and 2 are schematic diagrams of structures of two pixel circuits according to embodiments of the present disclosure. As shown in FIGS. 1 and 2, the pixel circuit includes a drive sub-circuit 101, a writing sub-circuit 102, a reset sub-circuit 103, a coupling sub-circuit 104, a storage sub-circuit 105, and a light emitting element.

The drive sub-circuit 101 is connected with a first node N1, a second node N2, and a third node N3 respectively, and is configured to provide a drive current to the light emitting element under control of signals of the first node N1 and the second node N2.

The writing sub-circuit 102 is respectively connected with a scan signal terminal (which may be a first scan signal terminal Gate_P or a second scan signal terminal Gate_N), a data signal terminal Data, and a second node N2, and is configured to write a signal of the data signal terminal Data to the second node N2 under control of a signal of the scan signal terminal.

The storage sub-circuit 105 is connected with a first voltage terminal VDD and the first node N1 respectively or is connected with the first node N1 and a third node N3 respectively, and is configured to store a voltage of the first node N1 (i.e., a control terminal of the drive sub-circuit 101).

The coupling sub-circuit 104 is connected with the first node N1 and a fourth node N4 respectively or is connected with the first node N1 and the first voltage terminal VDD respectively, and is configured to raise the voltage of the first node N1 (i.e., the control terminal of the drive sub-circuit 101) through a coupling action.

The reset sub-circuit 103 is respectively connected with a reset control signal terminal (which may be a first reset control signal terminal Reset_P or a second reset control signal terminal Reset_N), the scan signal terminal (which may be the first scan signal terminal Gate_P or the second scan signal terminal Gate_N), the fourth node N4, and the first node N1, and is configured to reset the fourth node N4 under control of the signal of the scan signal terminal and reset the first node N1 under control of a signal of the reset control signal terminal.

One end of the light emitting element is connected with the fourth node N4, and the other end of the light emitting element is connected with a second voltage terminal VSS.

In the pixel circuit according to the embodiment of the present disclosure, the voltage of the first node N1 (i.e., the control terminal of the drive sub-circuit 101) is raised through the coupling action of the coupling sub-circuit 104, and a drive current through the light emitting element is relatively large in an initial stage of light emitting, and gradually decreases to a normal value as the fourth node N4 is charged to a predetermined voltage. Moreover, when a load of the fourth node N4 is larger and charging is slower (that is, the transparent trace is longer), the drive current is kept at a larger value for a longer time, which prolongs high-speed charging time, achieves charging self-compensation of an equivalent capacitance load of the light emitting element, and improves display uniformity of a display panel.

In some exemplary implementation modes, as shown in FIGS. 1 and 2, the pixel circuit further includes a compensation sub-circuit 106.

The compensation sub-circuit 106 is connected with the scan signal terminal (which may be the first scan signal terminal Gate_P or the second scan signal terminal Gate_N), the first node N1, and the third node N3 respectively, and is configured to compensate a threshold voltage of the drive sub-circuit 101 under control of the signal of the scan signal terminal.

In some exemplary implementation modes, as shown in FIG. 1 and FIG. 2, the pixel circuit further includes a first light emitting control sub-circuit 107 and a second light emitting control sub-circuit 108.

The first light emitting control sub-circuit 107 is respectively connected with the first voltage terminal VDD, a light emitting control signal terminal (which may be a first light emitting control signal terminal EM_P or a second light emitting control signal terminal EM_N), and the second node N2, and is configured to form a path between the first voltage terminal VDD and the second node N2 under control of a signal of the light emitting control signal terminal.

The second light emitting control sub-circuit 108 is connected with the light emitting control signal terminal (which may be the first light emitting control signal terminal EM_P or the second light emitting control signal terminal EM_N), the third node N3, and the fourth node N4 respectively, and is configured to form a path between the third node N3 and the fourth node N4 under control of the signal of the light emitting control signal terminal.

Figure 3:
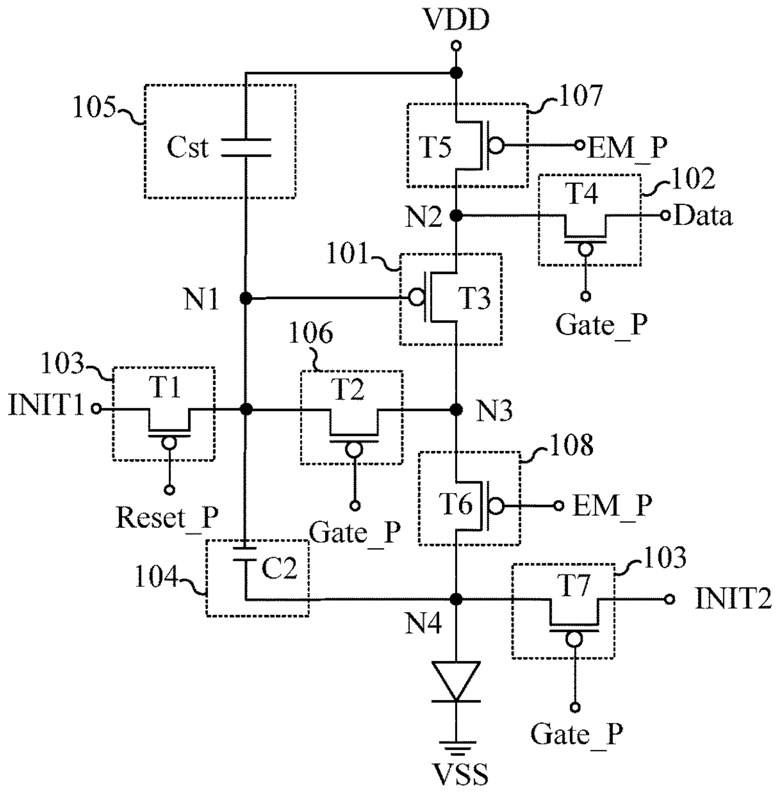
FIG. 3 is an equivalent circuit diagram of a pixel circuit according to an embodiment of the present disclosure.
Figure 4:
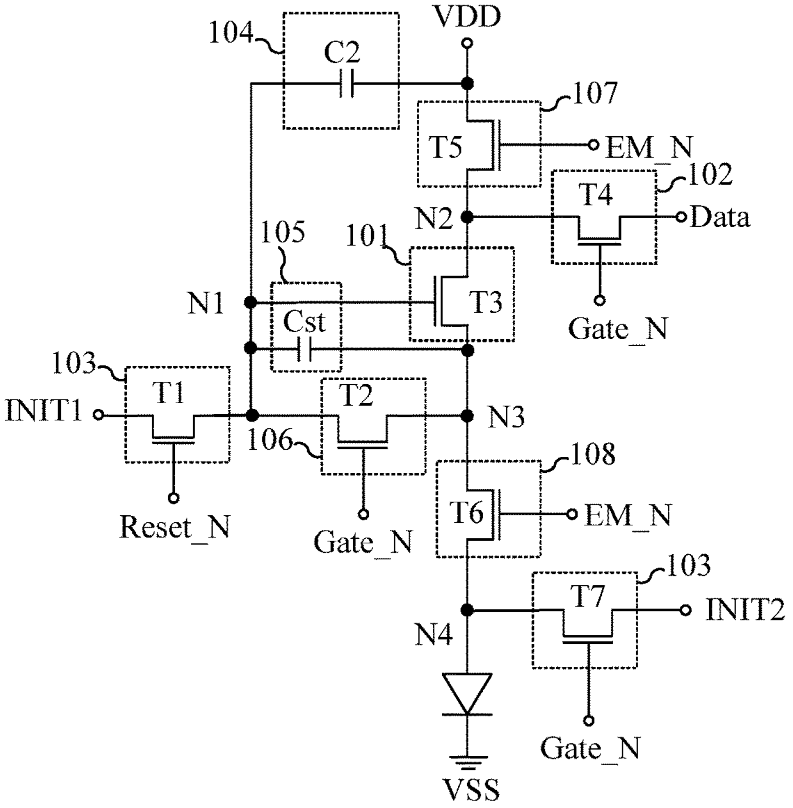
FIG. 4 is an equivalent circuit diagram of another pixel circuit according to an embodiment of the present disclosure.

In some exemplary implementation modes, FIGS. 3 and 4 are equivalent circuit diagrams of two pixel circuits according to the embodiments of the present disclosure, in the pixel circuit according to the embodiment of the present disclosure, the storage sub-circuit 105 includes a first capacitor Cst, and the coupling sub-circuit 104 includes a second capacitor C2.

As shown in FIG. 3, one end of the first capacitor Cst is connected with the first node N1, and the other end of the first capacitor Cst is connected with the first voltage terminal VDD; one end of the second capacitor C2 is connected with the first node N1, and the other end of the second capacitor C2 is connected with the fourth node N4; or, as shown in FIG. 4, one end of the first capacitor Cst is connected with the first node N1, and the other end of the first capacitor Cst is connected with the third node N3; one end of the second capacitor C2 is connected with the first node N1, and the other end of the second capacitor C2 is connected with the first voltage terminal VDD.

FIGS. 3 and 4 show two exemplary structures of the storage sub-circuit 105 and the coupling sub-circuit 104. It is easy for those skilled in the art to understand that implementation modes of the storage sub-circuit 105 and the coupling sub-circuit 104 are not limited thereto as long as respective functions of them can be achieved.

In some exemplary implementation modes, as shown in FIGS. 3 and 4, in the pixel circuit according to the embodiment of the present disclosure, the compensation sub-circuit 106 includes a second transistor T2, the drive sub-circuit 101 includes a third transistor (i.e., a drive transistor) T3, and the writing sub-circuit 102 includes a fourth transistor T4.

Among them, a control electrode of the second transistor T2 is connected with the scan signal terminal (which may be the first scan signal terminal Gate_P or the second scan signal terminal Gate_N), a first electrode of the second transistor T2 is connected with the third node N3, and a second electrode of the second transistor T2 is connected with the first node N1.

A control electrode of the third transistor T3 is connected with the first node N, a first electrode of the third transistor T3 is connected with the second node N2, and a second electrode of the third transistor T3 is connected with the third node N3.

A control electrode of the fourth transistor T4 is connected with the scan signal terminal (which may be the first scan signal terminal Gate_P or the second scan signal terminal Gate_N), a first electrode of the fourth transistor T4 is connected with the data signal terminal Data, and a second electrode of the fourth transistor T4 is connected with the second node N2.

FIGS. 3 and 4 show two exemplary structures of the compensation sub-circuit 106, the drive sub-circuit 101, and the writing sub-circuit 102. It is easy for those skilled in the art to understand that implementation modes of the compensation sub-circuit 106, the drive sub-circuit 101, and the writing sub-circuit 102 are not limited thereto as long as respective functions of them can be achieved.

In an exemplary embodiment, as shown in FIGS. 3 and 4, the first light emitting control sub-circuit 107 according to the embodiment of the present disclosure includes a fifth transistor T5, and the second light emitting control sub-circuit 108 includes a sixth transistor T6.

Among them, a control electrode of the fifth transistor T5 is connected with the light emitting control signal terminal (which may be the first light emitting control signal terminal EM_P or the second light emitting control signal terminal EM_N), a first electrode of the fifth transistor T5 is connected with the first voltage terminal VDD, and a second electrode of the fifth transistor T5 is connected with the second node N2.

A control electrode of the sixth transistor T6 is connected with the light emitting control signal terminal (which may be the first light emitting control signal terminal EM_P or the second light emitting control signal terminal EM_N), a first electrode of the sixth transistor T6 is connected with the third node N3, and a second electrode of the sixth transistor T6 is connected with the fourth node N4.

FIGS. 3 and 4 show two exemplary structures of the first light emitting control sub-circuit 107 and the second light emitting control sub-circuit 108. It is easy for those skilled in the art to understand that implementation modes of the first light emitting control sub-circuit 107 and the second light emitting control sub-circuit 108 are not limited thereto as long as respective functions of them can be achieved.

In an exemplary embodiment, as shown in FIGS. 3 and 4, the reset sub-circuit 103 according to the embodiment of the present disclosure includes a first transistor T1 and a seventh transistor T7.

Among them, a control electrode of the first transistor T1 is connected with the reset control signal terminal (which may be the first reset control signal terminal Reset_P or the second reset control signal terminal Reset_N), a first electrode of the first transistor T1 is connected with the first node N1, and a second electrode of the first transistor T1 is connected with a first initial signal terminal INIT1.

A control electrode of the seventh transistor T7 is connected with the scan signal terminal (which may be the first scan signal terminal Gate_P or the second scan signal terminal Gate_N), a first electrode of the seventh transistor T7 is connected with a second initial signal terminal INIT2, and a second electrode of the seventh transistor T7 is connected with the fourth node N4.

FIGS. 3 and 4 show two exemplary structures of the reset sub-circuit 103. It is easy for those skilled in the art to understand that an implementation mode of the reset sub-circuit 103 is not limited thereto as long as a function of the reset sub-circuit can be achieved.

In some exemplary embodiments, as shown in FIG. 3, in the pixel circuit according to the embodiment of the present disclosure, the storage sub-circuit 105 includes: a first capacitor Cst, the coupling sub-circuit 104 includes a second capacitor C2, the compensation sub-circuit 106 includes a second transistor T2, the drive sub-circuit 101 includes a third transistor T3, the writing sub-circuit 102 includes a fourth transistor T4, the first light emitting control sub-circuit 107 includes a fifth transistor T5, the second light emitting control sub-circuit 108 includes a sixth transistor T6, and the reset sub-circuit 103 includes a first transistor T1 and a seventh transistor T7.

Among them, one end of the first capacitor Cst is connected with the first node N1, and the other end of the first capacitor Cst is connected with the first voltage terminal VDD; one end of the second capacitor C2 is connected with the first node N1, and the other end of the second capacitor C2 is connected with the fourth node N4; a control electrode of the second transistor T2 is connected with the first scan signal terminal Gate_P, a first electrode of the second transistor T2 is connected with the third node N3, and a second electrode of the second transistor T2 is connected with the first node N1; a control electrode of the third transistor T3 is connected with the first node N1, a first electrode of the third transistor T3 is connected with the second node N2, and a second electrode of the third transistor T3 is connected with the third node N3; a control electrode of the fourth transistor T4 is connected with the first scan signal terminal Gate_P, a first electrode of the fourth transistor T4 is connected with the data signal terminal Data, and a second electrode of the fourth transistor T4 is connected with the second node N2; a control electrode of the fifth transistor T5 is connected with the first light emitting control signal terminal EM_P, a first electrode of the fifth transistor T5 is connected with the first voltage terminal VDD, and a second electrode of the fifth transistor T5 is connected with the second node N2; a control electrode of the sixth transistor T6 is connected with the first light emitting control signal terminal EM_P, a first electrode of the sixth transistor T6 is connected with the third node N3, and a second electrode of the sixth transistor T6 is connected with the fourth node N4; a control electrode of the first transistor T1 is connected with the first reset control signal terminal Reset_P, a first electrode of the first transistor T1 is connected with the first node N1, and a second electrode of the first transistor T1 is connected with the first initial signal terminal INIT1; a control electrode of the seventh transistor T7 is connected with the first scan signal terminal Gate_P, a first electrode of the seventh transistor T7 is connected with the second initial signal terminal INIT2, and a second electrode of the seventh transistor T7 is connected with the fourth node N4; one end of the light emitting element is connected with the fourth node N4, and the other end of the light emitting element is connected with the second voltage terminal VSS.

FIG. 3 shows exemplary structures of the drive sub-circuit 101, the writing sub-circuit 102, the compensation sub-circuit 106, the storage sub-circuit 105, the coupling sub-circuit 104, the first light emitting control sub-circuit 107, the second light emitting control sub-circuit 108, and the reset sub-circuit 103. It is easy for those skilled in the art to understand that implementation modes of the above sub-circuits are not limited thereto as long as respective functions of them can be achieved.

In some exemplary embodiments, as shown in FIG. 4, in the pixel circuit according to the embodiment of the present disclosure, the storage sub-circuit 105 includes: a first capacitor Cst, the coupling sub-circuit 104 includes a second capacitor C2, the compensation sub-circuit 106 includes a second transistor T2, the drive sub-circuit 101 includes a third transistor T3, the writing sub-circuit 102 includes a fourth transistor T4, the first light emitting control sub-circuit 107 includes a fifth transistor T5, the second light emitting control sub-circuit 108 includes a sixth transistor T6, and the reset sub-circuit 103 includes a first transistor T1 and a seventh transistor T7.

Among them, one end of the first capacitor Cst is connected with the first node N1, and the other end of the first capacitor Cst is connected with the third node N3; one end of the second capacitor C2 is connected with the first node N1, and the other end of the second capacitor C2 is connected with the first voltage terminal VDD; a control electrode of the second transistor T2 is connected with the second scan signal terminal Gate_N, a first electrode of the second transistor T2 is connected with the third node N3, and a second electrode of the second transistor T2 is connected with the first node N1; a control electrode of the third transistor T3 is connected with the first node N1, a first electrode of the third transistor T3 is connected with the second node N2, and a second electrode of the third transistor T3 is connected with the third node N3; a control electrode of the fourth transistor T4 is connected with the second scan signal terminal Gate_N, a first electrode of the fourth transistor T4 is connected with the data signal terminal Data, and a second electrode of the fourth transistor T4 is connected with the second node N2; a control electrode of the fifth transistor T5 is connected with the second light emitting control signal terminal EM_N, a first electrode of the fifth transistor T5 is connected with the first voltage terminal VDD, and a second electrode of the fifth transistor T5 is connected with the second node N2; a control electrode of the sixth transistor T6 is connected with the second light emitting control signal terminal EM_N, a first electrode of the sixth transistor T6 is connected with the third node N3, and a second electrode of the sixth transistor T6 is connected with the fourth node N4; a control electrode of the first transistor T1 is connected with the second reset control signal terminal Reset_N, a first electrode of the first transistor T1 is connected with the first node N1, and a second electrode of the first transistor T1 is connected with the first initial signal terminal INIT1; a control electrode of the seventh transistor T7 is connected with the second scan signal terminal Gate_N, a first electrode of the seventh transistor T7 is connected with the second initial signal terminal INIT2, and a second electrode of the seventh transistor T7 is connected with the fourth node N4; one end of the light emitting element is connected with the fourth node N4, and the other end of the light emitting element is connected with the second voltage terminal VSS.

FIG. 4 shows exemplary structures of the drive sub-circuit 101, the writing sub-circuit 102, the compensation sub-circuit 106, the storage sub-circuit 105, the coupling sub-circuit 104, the first light emitting control sub-circuit 107, the second light emitting control sub-circuit 108, and the reset sub-circuit 103. It is easy for those skilled in the art to understand that implementation modes of the above sub-circuits are not limited thereto as long as respective functions of them can be achieved.

In some exemplary embodiments, the light emitting element EL may be an Organic Light Emitting Diode (OLED) or a light emitting diode of any other type. In some examples, the light emitting element may be a Quantum Dot Light Emitting Diode (QLED), a Micro Light Emitting Diode (Micro-LED), or a Mini Diode (Mini-LED), etc.

In some exemplary embodiments, as shown in FIG. 3, the third transistor T3 is a P-type transistor, the first transistor T1 is a P-type transistor or an N-type transistor, the second transistor T2 is a P-type transistor or an N-type transistor, the fourth transistor T4 is a P-type transistor or an N-type transistor, the fifth transistor T5 is a P-type transistor or an N-type transistor, the sixth transistor T6 is a P-type transistor or an N-type transistor, and the seventh transistor T7 is a P-type transistor or an N-type transistor.

In some exemplary embodiments, as shown in FIG. 4, the third transistor T3 is an N-type transistor, the first transistor T1 is a P-type transistor or an N-type transistor, the second transistor T2 is a P-type transistor or an N-type transistor, the fourth transistor T4 is a P-type transistor or an N-type transistor, the fifth transistor T5 is a P-type transistor or an N-type transistor, the sixth transistor T6 is a P-type transistor or an N-type transistor, and the seventh transistor T7 is a P-type transistor or an N-type transistor.

In some exemplary embodiments, as shown in FIG. 3, the first transistor T1 to the seventh transistor T7 are all P-type transistors, or, as shown in FIG. 4, the first transistor T1 to the seventh transistor T7 are all N-type transistors.

In this embodiment, the first transistors T1 to the seventh transistors T7 may all be N-type thin film transistors or P-type thin film transistors, and transistors of a same type is used for the first transistors T1 to the seventh transistors T7s, which may unify a process flow, reduce a process procedure, and help to improve a yield of products.

In some exemplary embodiments, considering that a leakage current of a low temperature poly silicon thin film transistor is relatively small, the first transistor T1 to the seventh transistor T7 may all be low temperature poly silicon thin film transistors, and a thin film transistor may be a thin film transistor with a bottom gate structure or a thin film transistor with a top gate structure, which is not limited in the embodiment of the present disclosure, as long as a switching function can be achieved.

In some exemplary embodiments, the first capacitor Cst and the second capacitor C2 may be a liquid crystal capacitor composed of a pixel electrode and a common electrode, or may be an equivalent capacitor composed of a storage capacitor and a liquid crystal capacitor composed of a pixel electrode and a common electrode, which is not limited in the present disclosure.

In some exemplary embodiments, the first initial signal terminal INIT1 and the second initial signal terminal INIT2 may be a total initial signal terminal or two separate and independent initial signal terminals. By separating the first initial signal terminal INIT1 and the second initial signal terminal INIT2 into two independent initial signal terminals, a reset voltage of the light emitting element and a reset voltage of the first node N1 can be respectively adjusted, to achieve a better display effect and improve problems such as low-frequency flicker.

Figure 5:
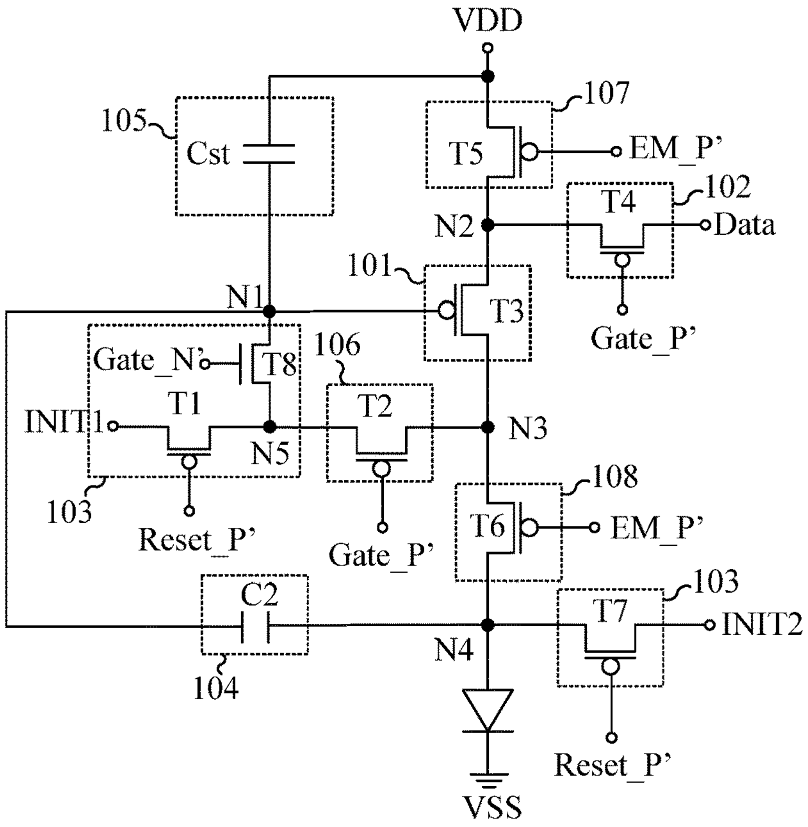
FIG. 5 is an equivalent circuit diagram of yet another pixel circuit according to an embodiment of the present disclosure.

In some exemplary embodiments, FIG. 5 is an equivalent circuit diagram of another pixel circuit according to an embodiment of the present disclosure, as shown in FIG. 5, the reset sub-circuit 103 according to the embodiment of the present disclosure includes a first transistor T1, a seventh transistor T7, and an eighth transistor T8.

Among them, a control electrode of the first transistor T1 is connected with a first reset control signal terminal Reset_P'. A first electrode of the first transistor T1 is connected with a first initial signal terminal INIT1. A second electrode of the first transistor T1 is connected with a fifth node.

A control electrode of the seventh transistor T7 is connected with the first reset control signal terminal Reset_P', a first electrode of the seventh transistor T7 is connected with a second initial signal terminal INIT2, and a second electrode of the seventh transistor T7 is connected with a fourth node N4.

A control electrode of the eighth transistor T8 is connected with a second scan signal terminal Gate_N'. A first electrode of the eighth transistor T8 is connected with the fifth node N5. A second electrode of the eighth transistor T8 is connected with a first node N1.

An exemplary structure of the reset sub-circuit 103 is shown in FIG. 5. It is easy for those skilled in the art to understand that an implementation mode of the reset sub-circuit 103 is not limited thereto as long as a function of the reset sub-circuit can be achieved.

In the pixel circuit according to the embodiment, voltage leakage of a control electrode of the drive sub-circuit 101 is less, and a retention rate of high brightness of the light emitting element is achieved.

In some exemplary embodiments, as shown in FIG. 5, in the pixel circuit according to the embodiment of the present disclosure, the storage sub-circuit 105 includes: a first capacitor Cst, the coupling sub-circuit 104 includes: a second capacitor C2, the compensation sub-circuit 106 includes a second transistor T2, the drive sub-circuit 101 includes a third transistor T3, the writing sub-circuit 102 includes a fourth transistor T4, the first light emitting control sub-circuit 107 includes a fifth transistor T5, the second light emitting control sub-circuit 108 includes a sixth transistor T6, and the reset sub-circuit 103 includes a first transistor T1, a seventh transistor T7, and an eighth transistor T8.

Among them, one end of the first capacitor Cst is connected with the first node N1, and the other end of the first capacitor Cst is connected with the first voltage terminal VDD; one end of the second capacitor C2 is connected with the first node N1, and the other end of the second capacitor C2 is connected with the fourth node N4; a control electrode of the second transistor T2 is connected with a first scan signal terminal Gate_P', a first electrode of the second transistor T2 is connected with the third node N3, and a second electrode of the second transistor T2 is connected with the first node N1; a control electrode of the third transistor T3 is connected with the first node N1, a first electrode of the third transistor T3 is connected with the second node N2, and a second electrode of the third transistor T3 is connected with the third node N3; a control electrode of the fourth transistor T4 is connected with the first scan signal terminal Gate_P', a first electrode of the fourth transistor T4 is connected with the data signal terminal Data, and a second electrode of the fourth transistor T4 is connected with the second node N2; a control electrode of the fifth transistor T5 is connected with a first light emitting control signal terminal EM_P', a first electrode of the fifth transistor T5 is connected with the first voltage terminal VDD, and a second electrode of the fifth transistor T5 is connected with the second node N2; a control electrode of the sixth transistor T6 is connected with the first light emitting control signal terminal EM_P', a first electrode of the sixth transistor T6 is connected with the third node N3, and a second electrode of the sixth transistor T6 is connected with the fourth node N4; a control electrode of the first transistor T1 is connected with the first reset control signal terminal Reset_P', a first electrode of the first transistor T1 is connected with the first initial signal terminal INIT1, and a second electrode of the first transistor T1 is connected with the fifth node; a control electrode of the seventh transistor T7 is connected with the first reset control signal terminal Reset_P', a first electrode of the seventh transistor T7 is connected with the second initial signal terminal INIT2, and a second electrode of the seventh transistor T7 is connected with the fourth node N4; a control electrode of the eighth transistor T8 is connected with the second scan signal terminal Gate_N', a first electrode of the eighth transistor T8 is connected with the fifth node N5, a second electrode of the eighth transistor T8 is connected with the first node N1, one end of the light emitting element is connected with the fourth node N4, and the other end of the light emitting element is connected with the second voltage terminal VSS.

FIG. 5 shows exemplary structures of the drive sub-circuit 101, the writing sub-circuit 102, the compensation sub-circuit 106, the storage sub-circuit 105, the coupling sub-circuit 104, the first light emitting control sub-circuit 107, the second light emitting control sub-circuit 108, and the reset sub-circuit 103. It is easy for those skilled in the art to understand that implementation modes of the above sub-circuits are not limited thereto as long as respective functions of them can be achieved.

In some exemplary implementation modes, the first transistor T1 to the seventh transistor T7 may be Low Temperature Poly Silicon (LTPS) Thin Film Transistors (TFTs), and the eighth transistor T8 may be an Indium Gallium Zinc Oxide (IGZO) thin film transistor.

In the present embodiment, compared with the low temperature poly silicon thin film transistor, the indium gallium zinc oxide thin film transistor generates less leakage current, therefore, setting the eighth transistor T8 as the indium gallium zinc oxide thin film transistor may significantly reduce generation of leakage current. In addition, the first transistor T1 and the second transistor T2 do not need to be set as indium gallium zinc oxide thin film transistors, and since a dimension of a low temperature poly silicon thin film transistor is usually smaller than that of an indium gallium zinc oxide thin film transistor, occupied space of the pixel circuit according to the embodiment will be relatively small, which is beneficial to improving a resolution of the display panel.

In the pixel circuit according to the embodiment, good switching characteristics of an LTPS-TFT and low leakage characteristics of an Oxide-TFT are combined, and low-frequency drive (1 Hz~60 Hz) may be achieved, thus greatly reducing power consumption of a display screen.

A working process of a pixel circuit in a period of one frame will be described below in combination with the pixel circuit shown in FIG. 3 and the working timing diagram shown in FIG. 6 by taking a case that all of the first transistor T1 to the seventh transistor T7 in the pixel circuit provided in the embodiment of the present disclosure are P-type thin film transistors as an example, and a technical solution according to the embodiment of the present disclosure is further explained through a working process of a drive circuit.

Figure 7:
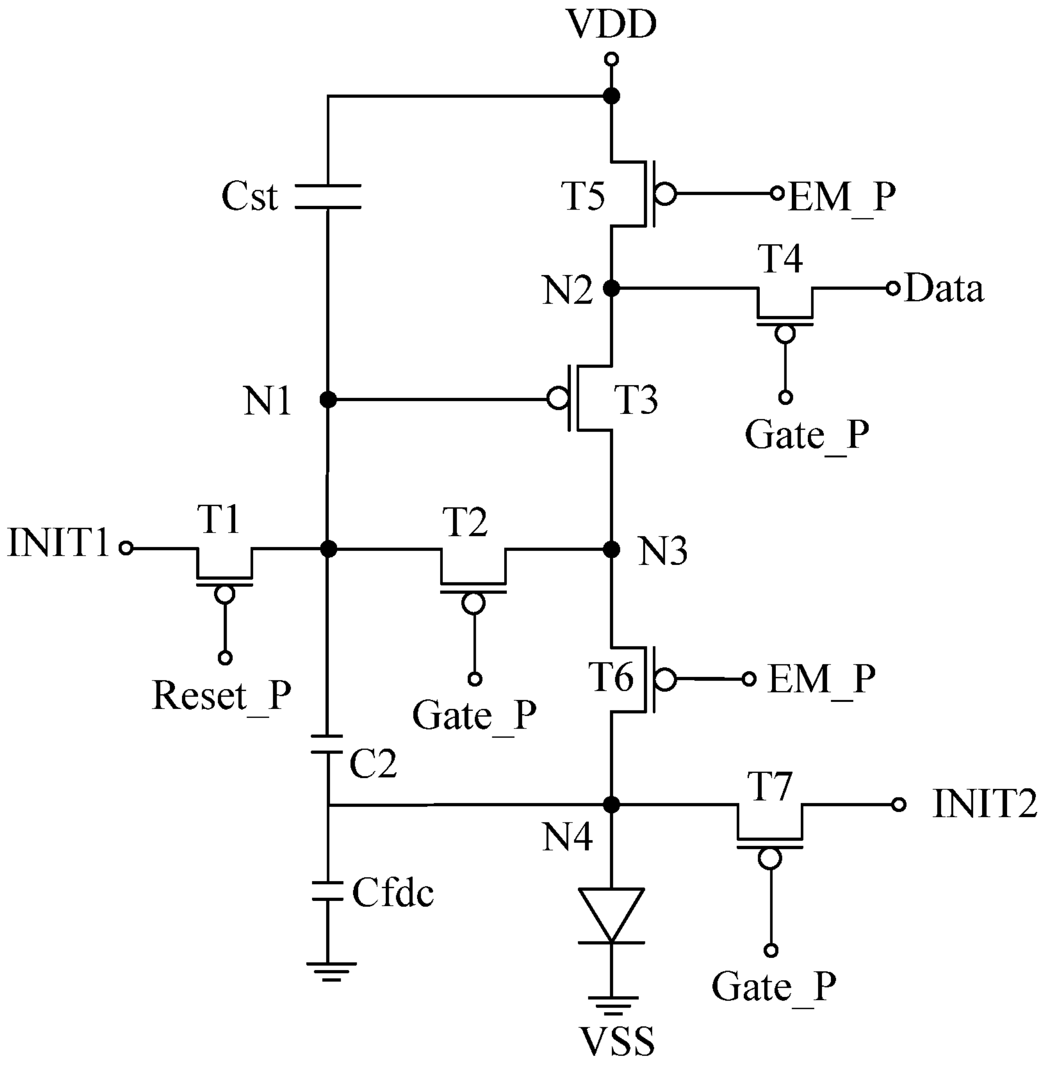
FIG. 7 is a schematic diagram of an equivalent capacitance load of the pixel circuit shown in FIG. 3.

FIG. 7 is a schematic diagram of an equivalent capacitance load corresponding to the pixel circuit shown in FIG. 3. As shown in FIG. 7, for the pixels in a region of full display with camera, since the pixel circuit is externally placed in a non-camera region through a transparent trace, the transparent trace is relatively long and an equivalent capacitance load Cfdc is relatively large, which cannot be ignored. The pixel circuit according to this embodiment includes seven transistor units (T1 to T7), two capacitor units (Cst and C2) and four power supply signal terminals (VDD, VSS, INIT1, and INIT2), wherein the first voltage terminal VDD continuously provides a high-level signal and the second voltage terminal VSS continuously provides a low-level signal. In an exemplary implementation mode, the working process of the pixel circuit in the period of one frame includes following stages.

In a first stage t1, referred to as an initialization stage, signals of the first scan signal terminal Gate_P and the first light emitting control signal terminal EM_P are both high-level signals, and a signal of the first reset control signal terminal Reset_P is a low-level signal. The first transistor T1 is turned on, a signal of the first initial signal terminal INIT1 is provided to the first node N1, to initialize the first capacitor Cst, and clear an original data voltage in the first capacitor. The second transistor T2, the third transistor T3, the fourth transistor T4, the fifth transistor T5, the sixth transistor T6 and the seventh transistor T7 are turned off, and the OLED does not emit light in this stage.

In a second stage t2, referred to as a data writing stage or threshold compensation stage, a signal of the first scan signal terminal Gate_P is a low-level signal, signals of the first reset control signal terminal Reset_P and the first light emitting control signal terminal EM_P are both high-level signals, and the data signal terminal Data outputs a data voltage. In this stage, the second end of the first capacitor Cst is at a low level, so that the third transistor T3 is turned on. The signal of the first scan signal terminal Gate_P is the low-level signal, so that the second transistor T2, the fourth transistor T4, and the seventh transistor T7 are turned on. The second transistor T2 and the fourth transistor T4 are turned on so that a data voltage $V_{data1}$ output from the data signal terminal Data is provided to the first node N1 through the second node N2, the turn-on third transistor T3, the third node N3, and the turn-on second transistor T2, a sum of the data voltage $V_{data1}$ output from the data signal terminal Data and a threshold voltage Vth of the third transistor T3 is charged into the first capacitor Cst, that is, a voltage of the second end (the first node N1) of the first capacitor Cst is $V_{data1}$+Vth, wherein $V_{data1}$ is the data voltage output from the data signal terminal Data, and Vth is the threshold voltage of the third transistor T3. A gate-source voltage difference of the third transistor is $V_{gs}=V_{DTFT\_G}-Vdd=V_{data1}+Vth-Vdd$, wherein Vdd is a power supply voltage output by the first voltage terminal VDD. The seventh transistor T7 is turned on so that an initial voltage of the second initial signal terminal INIT2 is provided to a first electrode of the OLED, to initialize (reset) the first electrode of the OLED, clear a pre-stored voltage inside the OLED, and initialization is completed, that is, $V_{N4}=V_{init2}$. A signal of the first reset control signal terminal Reset_P is a high-level signal, so that the first transistor T1 is turned off. A signal of the first light emitting control signal terminal EM_P is a high-level signal, so that the fifth transistor T5 and the sixth transistor T6 are turned off, and the OLED does not emit light.

In a third stage t3, referred to as a hold stage, signals of the first scan signal terminal Gate_P, the first reset control signal terminal Reset_P, and the first light emitting control signal terminal EM_P are all high-level signals, the second transistor T2, the fourth transistor T4, and the seventh transistor T7 are turned off, a voltage of the first node N1 is maintained constant at $V_{data1}$+Vth, a voltage of the fourth node N4 is maintained constant at $V_{init2}$, and the OLED does not emit light.

In a fourth stage t4, referred to as a light emitting stage, a signal of the first light emitting control signal terminal EM_P is a low-level signal, and signals of the first scan signal terminal Gate_P and the first reset control signal terminal Reset_P are both high-level signals. The signal of the first light emitting control signal terminal EM_P is the low-level signal, so that the fifth transistor T5 and the sixth transistor T6 are turned on. A power supply voltage output from the first voltage terminal VDD provides a drive voltage to the first electrode of the OLED through the turned-on fifth transistor T5, the third transistor T3, and the sixth transistor T6, and the OLED emits light when a drive current flows through it.

A magnitude of the drive current Id of the OLED when it just emits light is as follows.

$$Id = \frac{1}{2} * \mu * C_{ox} * \frac{W}{L} * (V_{gs} - V_{th})^2 = \frac{k}{2}(V_{data1} - Vdd)^2$$

Herein, Id is a drive current flowing through the third transistor T3, i.e., the drive current for the drive transistor (DTFT), W is a width of a channel of the third transistor T3, L is a length of the channel of the third transistor T3, W/L is a width-to-length ratio (i.e., a ratio of a width to a length) of the channel of the third transistor T3, u is an electron mobility, Cox is a capacitance per unit area, K is a constant, $V_{gs}$ is a voltage difference between a gate electrode and a first electrode of the third transistor T3, Vth is the threshold voltage of the third transistor T3, $V_{data1}$ is a charging voltage output by the data signal terminal Data, and in the region of full display with camera, $V_{data1}=V_{data}$, and $V_{data}$ is an actual data voltage output by the data signal terminal.

In a fourth stage t4, as a voltage of the fourth node N4 gradually rises from $V_{init2}$ to $V_{OLED}$, the first node N1 is electrically coupled through the second capacitor C2, so that a voltage of the first node N1 rises, and finally the voltage of the first node N1 will rise from $V_{DTFT\_G}=V_{data1}+Vth$ to $V_{DTFT\_G}=V_{data1}+Vth+(V_{OLED}-V_{init2})*c2/(c2+cst)$, wherein $V_{OLED}$ is a voltage of the light emitting element when it stably emits light, c2 is a capacitance value of the second capacitor C2, and cst is a capacitance value of the first capacitor Cst. A voltage rising amount of the first node N1 of all pixels is $(V_{OLED}-V_{init2})*c2/(c2+cst)$, therefore, for pixels in a normal region (i.e., a non-full display with camera region), let the charging voltage of the data signal terminal Data in the second stage t2 be $V_{data1}=V_{data}-(V_{OLED}-V_{init2})*c2/(c2+cst)$, then a final drive current is as follows.

$$Id = \frac{1}{2} * \mu * C_{ox} * \frac{W}{L} * (V_{gs} - V_{th})^2 = \frac{k}{2}(V_{data} - Vdd)^2$$

It may be seen from the above formula that a current I flowing through the light emitting element EL is unrelated to the threshold voltage Vth of the third transistor T3, so that an influence of the threshold voltage Vth of the third transistor T3 on the current I is eliminated, and uniformity of brightness is ensured.

For pixel circuit designs in some implementation modes, the drive current Id of the drive transistor (DTFT) is always a fixed value. In the pixel circuit according to the embodiment of the present disclosure, Id is a relatively large value in an initial stage of light emitting, and as the fourth node N4 is charged to a predetermined voltage, Id is gradually reduced to a normal value. Moreover, when a load of the fourth node N4 is larger and charging is slower, Id is maintained at a larger value for a longer time, which improves high-speed charging time and achieves self-compensation of capacitive charging of the equivalent capacitance load Cfdc.

Figure 6:
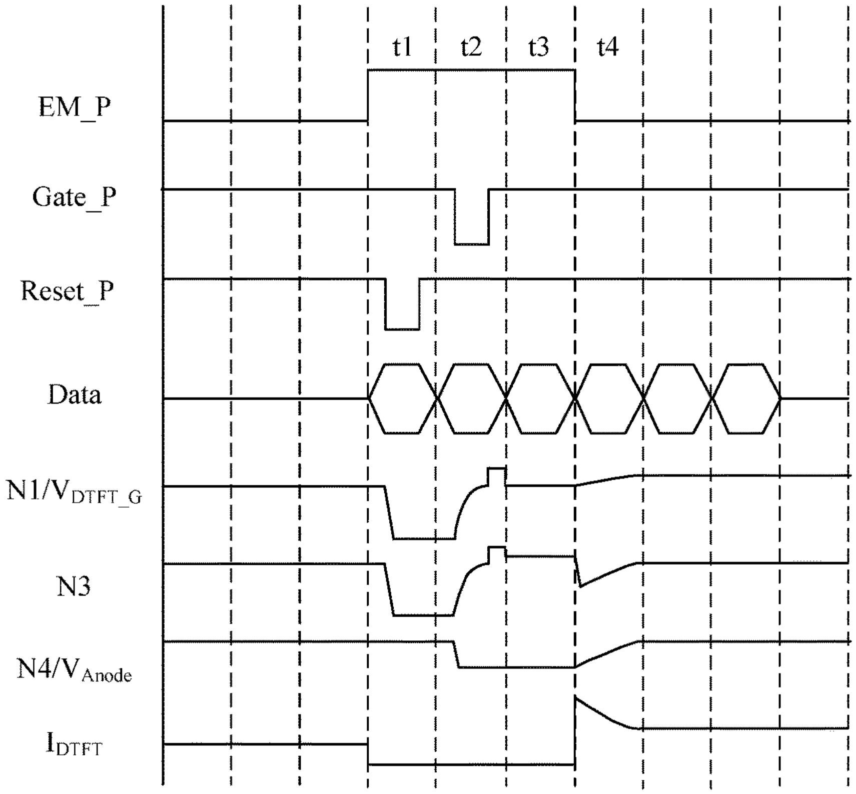
FIG. 6 is a working timing diagram of the pixel circuit shown in FIG. 3.

Working timing of pixel circuits shown in FIGS. 4 and 5 may be set with reference to FIG. 6, which will not be repeated in the embodiments of the present disclosure.

Based on the above-mentioned working timing, the pixel circuit eliminates residual positive charges of the light emitting element after the light emitting element emitted light last time, achieves compensation for a gate voltage of a drive transistor, avoids an influence of drift of a threshold voltage of the drive transistor on a drive current of the light emitting element EL, and improves uniformity of a displayed image and display quality of a display panel.

An embodiment of the present disclosure also provides a display panel, a display region of the display panel has multiple sub-pixels, and the pixel circuit according to any embodiment of the present disclosure is disposed in at least one sub-pixel.

Figure 8:
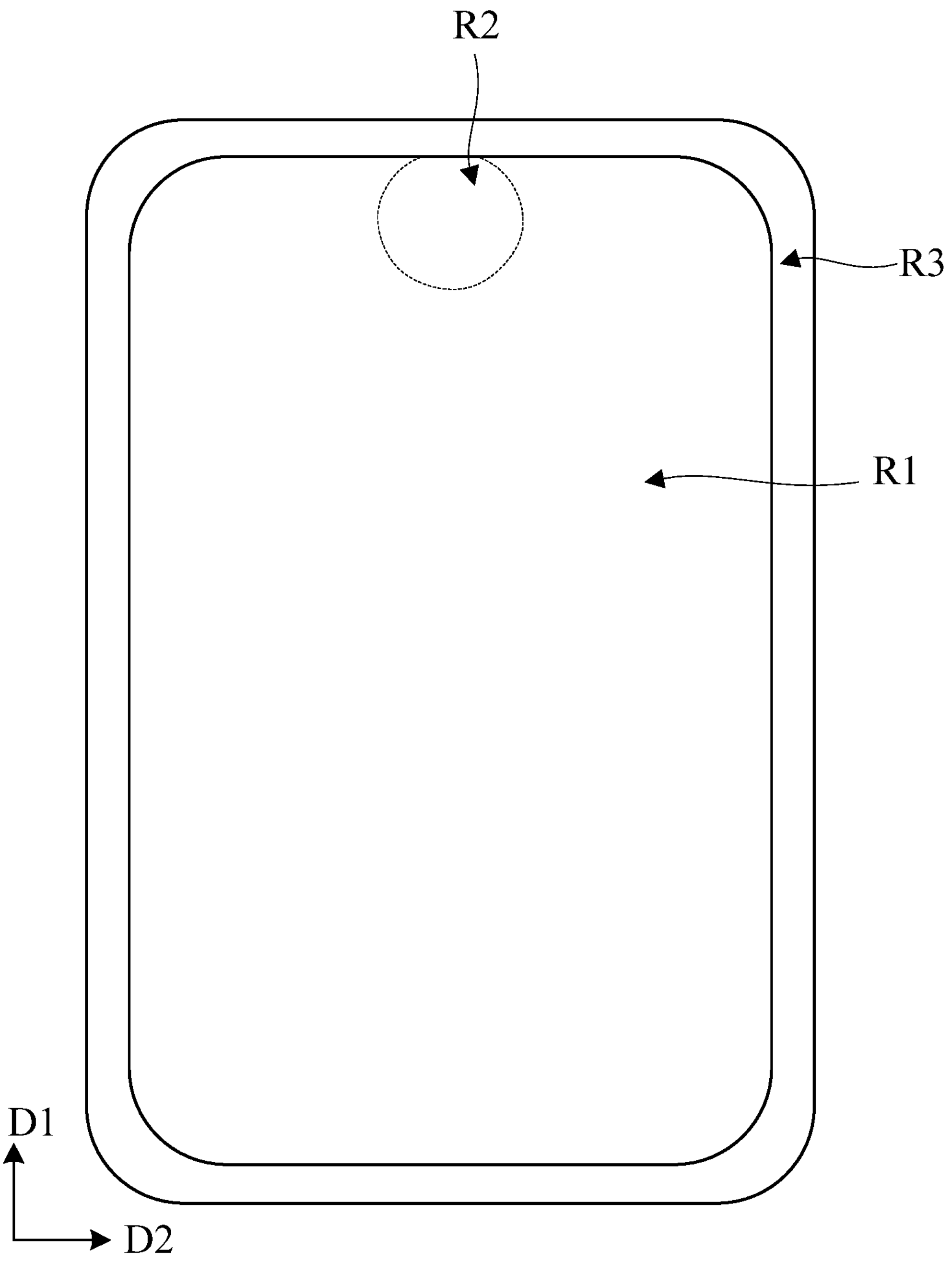
FIG. 8 is a schematic diagram of a structure of a display panel according to an embodiment of the present disclosure.

In some exemplary embodiments, as shown in FIG. 8, a display panel includes a display region and a bezel region R3 located at a periphery of the display region. The bezel region R3 surrounds the display region. The display region includes a first display region R1 and a second display region R2, and the first display region R1 at least partially surrounds the second display region R2. For example, the second display region R2 shown in FIG. 12 is located at a top middle position of a display substrate, and one side of the second display region R2 is adjacent to the bezel region R3. However, this embodiment is not limited thereto. For example, the second display region R2 may be located at another position such as an upper left corner position or an upper right corner position of the display substrate.

In some exemplary implementation modes, as shown in FIG. 8, the display region may be of a shape of a rectangle, e.g., a rectangle with rounded corners. The second display region R2 may be circular. However, this embodiment is not limited thereto. For example, the second display region R2 may be of a shape of a rectangle, an ellipse, or the like.

In some exemplary implementation modes, the first display region R1 may be a non-light-transmissive display region and the second display region R2 may be a light-transmissive display region. That is, the first display region R1 is non-light-transmissive and the second display region R2 is light-transmissive. For example, an orthographic projection of hardware such as a photosensitive sensor (e.g. a camera) on the display substrate may be located within the second display region R2 of the display substrate, that is, the first display region R1 may be a non-full display with camera region and the second display region R2 may be a full display with camera region. In this example, the display substrate does not need to be punched, and under a premise of ensuring practicability of the display substrate, it is possible to achieve a true full-screen.

In some exemplary implementation modes, the display panel may include multiple sub-pixels disposed on a base substrate. At least one sub-pixel includes a pixel circuit and a light emitting element. The pixel circuit is configured to drive the light emitting element. For example, the pixel circuit is configured to provide a drive current to drive the light emitting element to emit light. For example, the light emitting element may be an Organic Light Emitting Diode (OLED), and the light emitting element emits red light, green light, blue light, or white light, etc. under drive of its corresponding pixel circuit. A color of light emitted from the light emitting element may be determined as required. In some examples, the light emitting element may include a first electrode (e.g. an anode), a second electrode (e.g. a cathode), and an organic emitting layer disposed between the first electrode and the second electrode. Among them, the first electrode may be connected with the pixel circuit. However, this embodiment is not limited thereto.

In some exemplary implementation modes, one pixel unit may include three sub-pixels (for example, one red sub-pixel R, one blue sub-pixel B, and one green sub-pixel G), and the three sub-pixels may be arranged horizontally, vertically, or in a manner like a Chinese character "品". For example, one pixel unit may include four sub-pixels (one red sub-pixel R, one blue sub-pixel B, one green sub-pixel G, and one white sub-pixel), and the four sub-pixels may be arranged horizontally, vertically, or in a manner to form a square. However, the embodiment of the present disclosure is not limited thereto.

In some exemplary implementation modes, in order to improve a light transmittance of the second display region R2, it is possible to dispose only a light emitting element in the second display region R2, and dispose a pixel circuit for driving the light emitting element of the second display region R2 in the first display region R1. That is, the light transmittance of the second display region R2 is improved by separately disposing the light emitting element and the pixel circuit. In this example, in the second display region R2, no pixel circuit is disposed.

Figure 9:
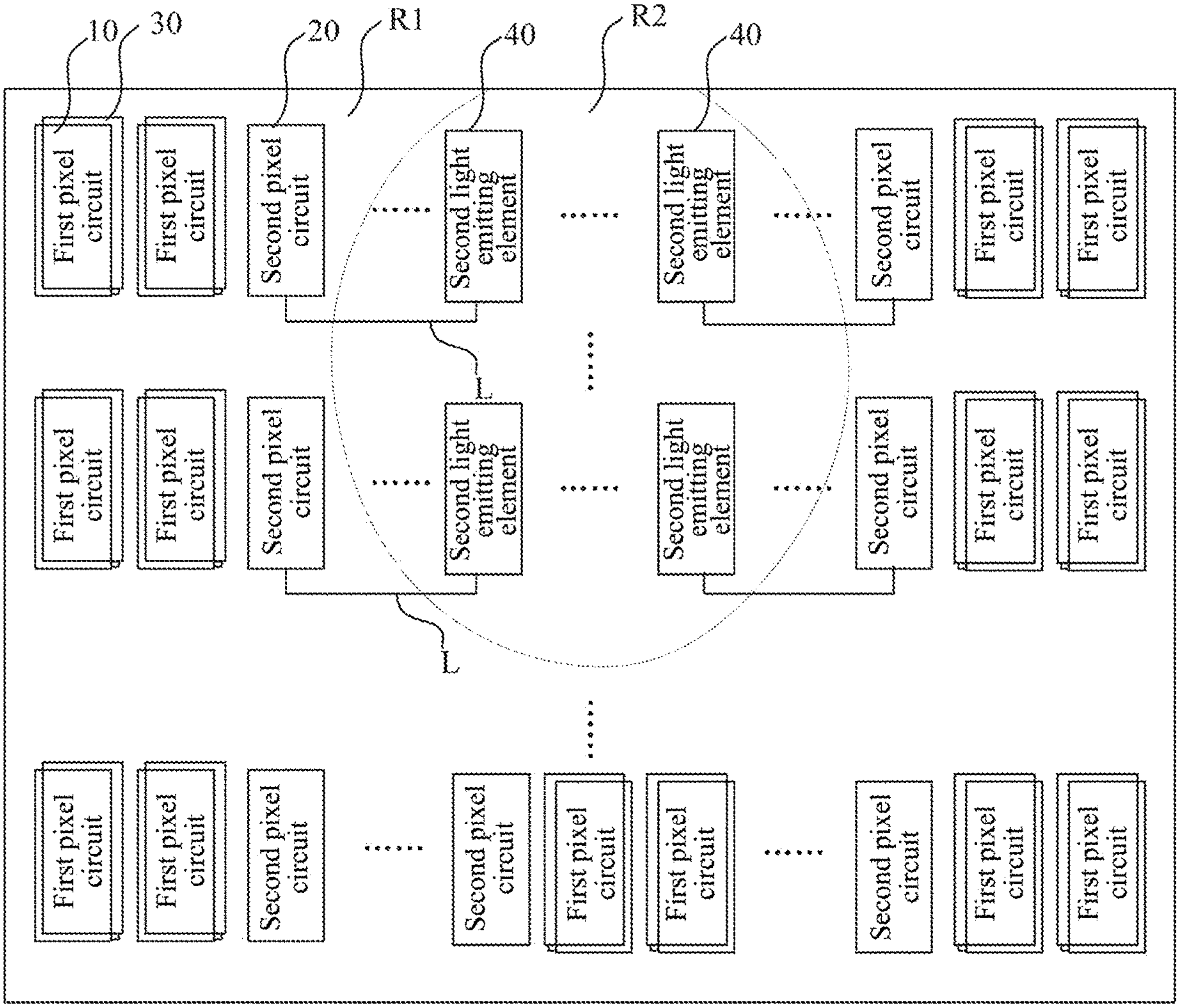
FIG. 9 is a schematic diagram of a partial structure of a display panel according to an embodiment of the present disclosure.

FIG. 9 is a schematic diagram of a partial structure of a display panel according to at least one embodiment of the present disclosure. In some exemplary implementation modes, as shown in FIG. 9, the display panel includes multiple first pixel circuits 10, multiple second pixel circuits 20, and multiple first light emitting elements 30 located in a first display region R1, and multiple second light emitting elements 40 located in a second display region R2. The multiple second pixel circuits 20 may be distributed among the multiple first pixel circuits 10 at intervals; for example, multiple first pixel circuits 10 may be arranged between two adjacent second pixel circuits 20 in a first direction. At least one first pixel circuit 10 in the multiple first pixel circuits 10 may be connected with at least one first light emitting element 30 in the multiple first light emitting elements 30, and an orthographic projection of at least one first pixel circuit 10 on a base substrate may be at least partially overlapped with an orthographic projection of at least one first light emitting element 30 on the base substrate. A first pixel circuit 10 may be configured to provide a drive signal to a first light emitting element 30 with which the first pixel circuit 10 is connected to drive the first light emitting element 30 to emit light. At least one second pixel circuit 20 in the multiple second pixel circuits 20 may be connected with at least one second light emitting element 40 in the multiple second light emitting elements 40 through a conductive line L. A second pixel circuit 20 may be configured to provide a drive signal to a second light emitting element 40 with which the second pixel circuit is connected with to drive the second light emitting element 40 to emit light. Since a second light emitting element 40 and a second pixel circuit 20 are located in different regions, there is no overlapping portion between an orthographic projection of at least one second pixel circuit 20 on the base substrate and an orthographic projection of at least one second light emitting element 40 on the base substrate.

In some exemplary implementation modes, a density of second light emitting elements 40 of the second display region R2 may be approximately equal to a density of first light emitting elements 30 of the first display region R1. That is, a resolution of the second display region R2 may be approximately the same as that of the first display region R1. However, this embodiment is not limited thereto. For example, a density of second light emitting elements 40 may be larger or smaller than that of first light emitting elements 30. That is, a resolution of the second display region R2 may be larger or smaller than that of the first display region R1.

In some exemplary implementation modes, a light emitting area of a second light emitting element 40 may be smaller than a light emitting area of a first light emitting element 30. That is, the light emitting area of the first light emitting element 30 is larger than that of the second light emitting element 40. Among them, a light emitting area of a light emitting element may correspond to an area of an opening of a pixel definition layer. In some examples, in the second display region R2, a light-transmissive region is disposed between adjacent second light emitting elements 40. For example, multiple light-transmissive regions are connected with each other to form a continuous light-transmissive region separated by multiple second light emitting elements 40. The conductive line L may be made of a transparent conductive material to improve a light transmittance of a light-transmissive region as much as possible.

In some exemplary implementation modes, in the first display region R1, a region where a second pixel circuit 20 is disposed may be obtained by reducing a dimension of a first pixel circuit 10 in a second direction D2. For example, the dimension of the first pixel circuit 10 in the second direction D2 may be smaller than a dimension of a first light emitting element 30 in the second direction D2. The second direction D2 is, for example, a sub-pixel row direction, but it is not limited to this. In other embodiments, the second direction D2 may be a sub-pixel column direction. This exemplary implementation mode will be described by taking a case that the second direction D2 is the sub-pixel row direction as an example. For example, dimensions of the first pixel circuit 10 and the second pixel circuit 20 in the second direction D2 may be the same, and a dimension of each pixel circuit in the second direction D2 may differ from a dimension of a first light emitting element 30 in the second direction D2 by about 4 microns (μm). A dimension of each pixel circuit in a first direction D1 is approximately the same as that of a first light emitting element 30 in the first direction D1. Among them, the first direction D1 is perpendicular to the second direction D2.

In some exemplary implementation modes, the first pixel circuit 10 and the second pixel circuit 20 may each be a pixel circuit according to any embodiment of the present disclosure, for example, the first pixel circuit 10 and the second pixel circuit 20 may each be any pixel circuit in FIG. 3, FIG. 4, or FIG. 5.

In some exemplary implementation modes, a charging voltage of a data signal terminal Data of the first pixel circuit 10 is $V_{data1}=V_{data}-(V_{OLED}-V_{init2})*c2/(c2+cst)$, and a charging voltage of a data signal terminal Data of the second pixel circuit 20 is $V_{data1}=V_{data}$, wherein $V_{OLED}$ is a voltage of a first light emitting element 30 when it stably emits light, c2 is the capacitance value of the second capacitor C2, and cst is the capacitance value of the first capacitor Cst.

In some exemplary implementation modes, the first pixel circuit 10 may be the pixel circuit in other implementation modes, the second pixel circuit 20 may be the pixel circuit according to any embodiment of the present disclosure, for example, the first pixel circuit 10 may be 3T1C, 7T1C, 8T1C, etc., which is not limited in the present disclosure, and the second pixel circuit 20 may be any pixel circuit in FIG. 3, FIG. 4, or FIG. 5.

Figure 10A:
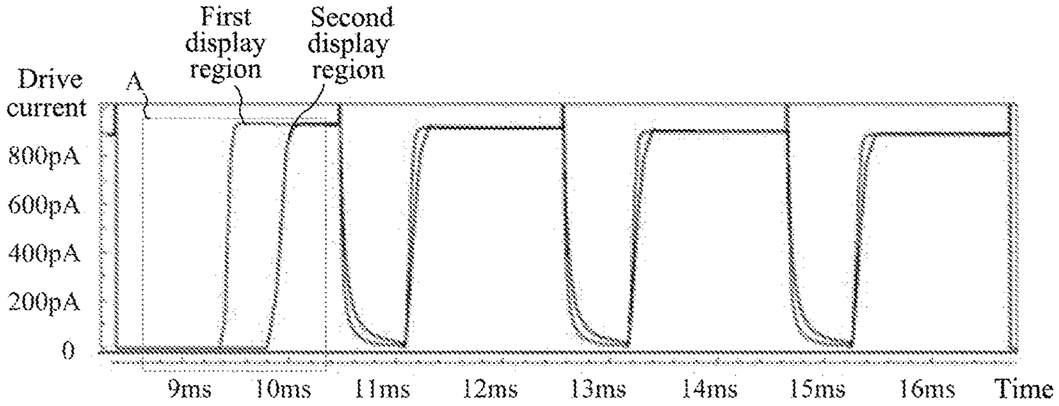
FIG. 10*a* is a simulation waveform diagram of a drive current of a pixel circuit in some implementation modes.
Figure 10B:
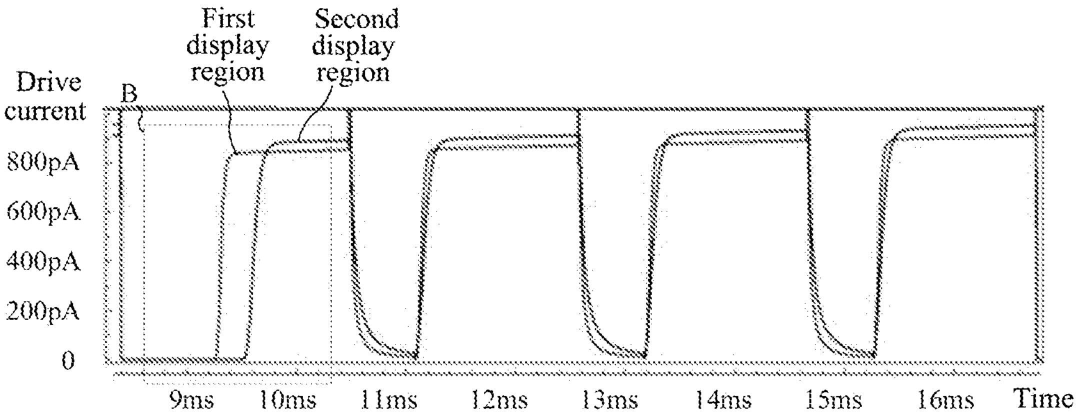
FIG. 10*b* is a simulation waveform diagram of a drive current of a pixel circuit according to an embodiment of the present disclosure.
Figure 11A:
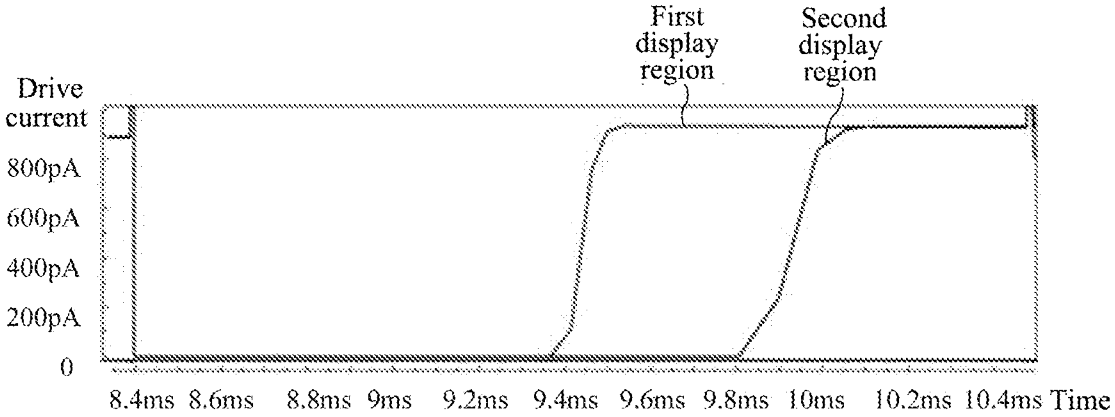
FIG. 11*a* is an enlarged view of a region A in FIG. 10*a*.
Figure 11B:
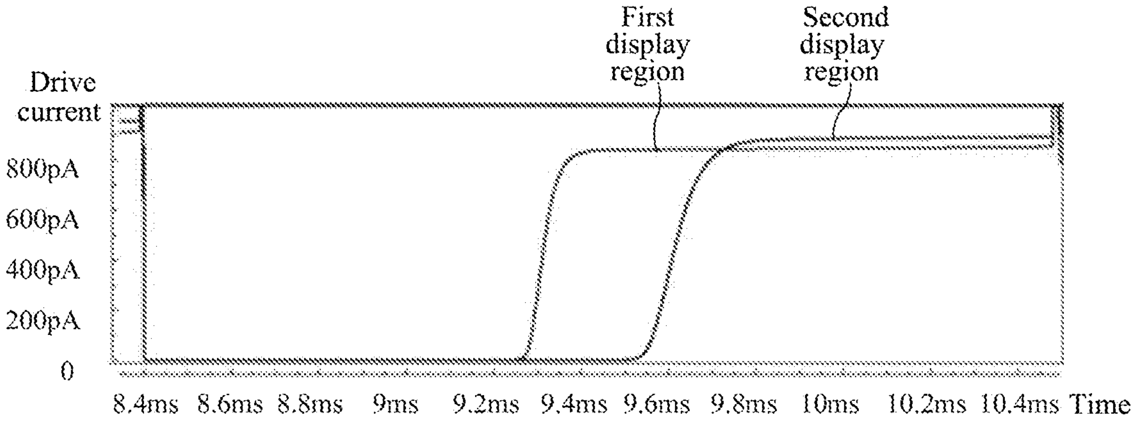
FIG. 11*b* is an enlarged view of a region B in FIG. 10*b*.

FIG. 10*a* is a simulation waveform diagram of a drive current of a pixel circuit in some implementation modes, FIG. 10*b* is a simulation waveform diagram of a drive current of a pixel circuit according to an embodiment of the present disclosure (wherein the structure of the pixel circuit shown in FIG. 3 is adopted for both the first pixel circuit 10 and the second pixel circuit 20), FIG. 11*a* is an enlarged view of a region A in FIG. 10*a*, and FIG. 11*b* is an enlarged view of a region B in FIG. 10*b*. FIGS. 10*a* and 10*b* both simulate time of one frame, wherein a first pulse stage includes a charging stage, the pixel circuit in remaining three pulse stages only acts as a switching and does not charge. It may be seen from the figures that compared with a drive current of a pixel circuit in some implementation modes, in the display panel according to the embodiment of the present disclosure in the first pulse stage, a drive current (approximately proportional to display brightness) in a second display region (i.e. a full display with camera region) charges faster.

Figure 12A:
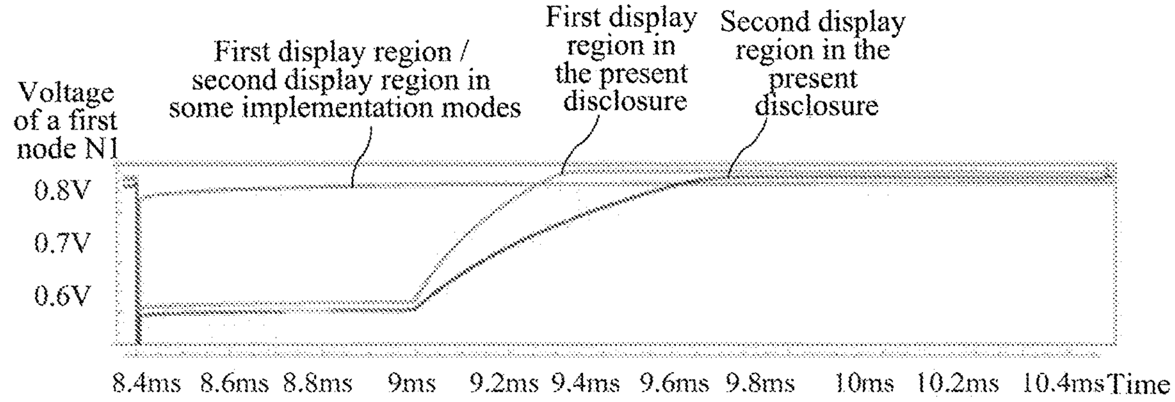
FIG. 12*a* is a simulation comparison diagram of a voltage of a first node of a pixel circuit according to an embodiment of the present disclosure and a voltage of a first node of a pixel circuit in some implementation modes.
Figure 12B:
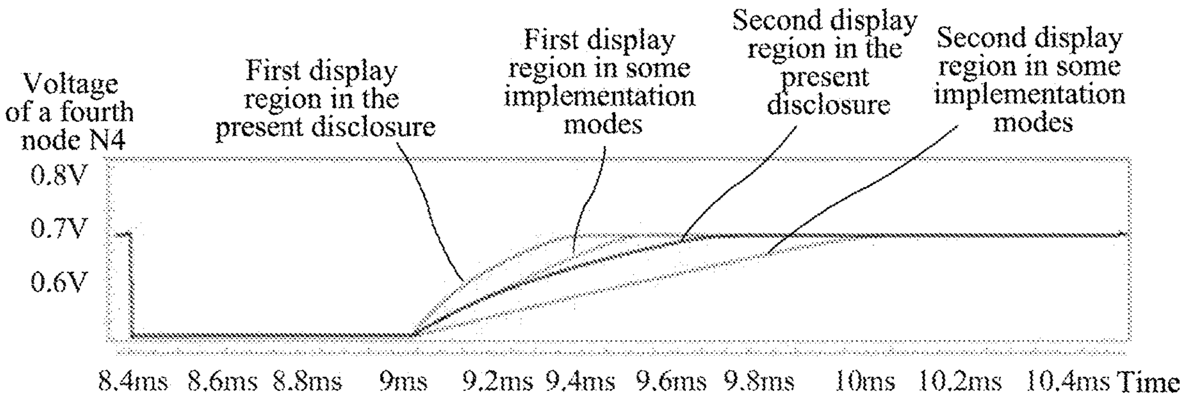
FIG. 12*b* is a simulation comparison diagram of a voltage of a fourth node of a pixel circuit according to an embodiment of the present disclosure and a voltage of a first node of a pixel circuit in some implementation modes.
Figure 13:
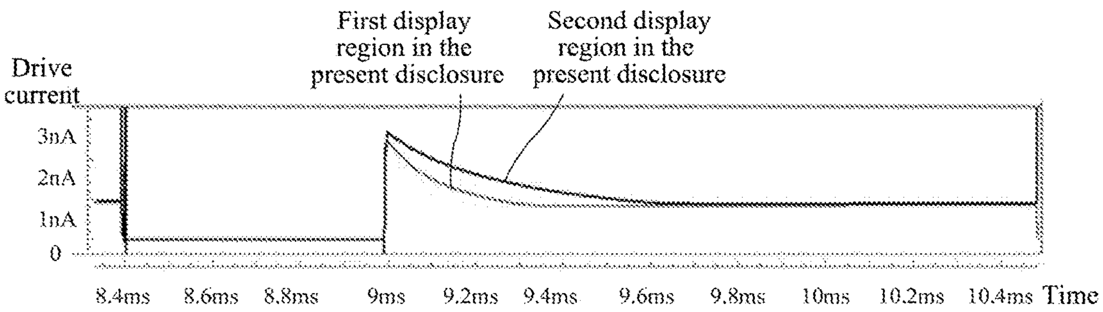
FIG. 13 is a simulation comparison diagram of drive currents of a display panel in a first display region and a second display region according to an embodiment of the present disclosure.

FIG. 12*a* is a simulation comparison diagram of a voltage of a first node of a pixel circuit according to an embodiment of the present disclosure and a voltage of a first node of a pixel circuit in some implementation modes, FIG. 12*b* is a simulation comparison diagram of a voltage of a fourth node of a pixel circuit according to an embodiment of the present disclosure and a voltage of a first node of a pixel circuit in some implementation modes, FIG. 13 is a simulation comparison diagram of drive currents of a display panel in a first display region and a second display region according to an embodiment of the present disclosure. As may be seen from FIG. 12*a*, FIG. 12*b*, and FIG. 13, the drive current in the second display region of the display panel according to the embodiment of the present disclosure is very large at beginning and decreases slowly, a high current is maintained for a long time, and an improvement effect of a current is relatively good.

An embodiment of the present disclosure also provides a display apparatus including a display panel and a photosensitive element, the display panel includes a first display region and a second display region, the first display region at least partially encloses the second display region, and the photosensitive element is located in the second display region.

The display panel further includes multiple pixel circuits and multiple first light emitting elements located in the first display region; wherein the multiple pixel circuits include multiple first pixel circuits and multiple second pixel circuits, the multiple second pixel circuits are distributed among the multiple first pixel circuits, and at least one pixel circuit of the multiple first pixel circuits is connected with at least one light emitting element of the multiple first light emitting elements.

The display panel further includes multiple second light emitting elements located in the second display region; at least one pixel circuit in the multiple second pixel circuits is connected with at least one light emitting element in the multiple second light emitting elements.

A second pixel circuit is the pixel circuit according to any embodiment of the present disclosure.

With rapid development of the information age, manufacturing industries such as mobile phones and computers have also developed rapidly. In order to achieve full-screen display, a sensor such as a camera, fingerprint recognition, and face recognition are usually integrated under a screen, so a concept of under-screen functional region appears, that is, sensing functions such as camera shooting and distance sensing are disposed under the screen. The display apparatus according to the embodiment of the present disclosure, the photosensitive element is disposed in the second display region, may both transmit light and display in the second display region, which is convenient for achieving under-screen integration of the photosensitive element and a full-screen display design, and may be applied to under-screen camera shooting, fingerprint recognition, face recognition and the like. The display apparatus of the present disclosure may be any product or component with a display function, such as a mobile phone, a tablet computer, a television, a display, a laptop computer, a digital photo frame, or a navigator. In an exemplary implementation mode, the display apparatus may be a wearable display apparatus which may be worn on a human body in some manners, such as a smart watch and a smart bracelet.

An embodiment of the present disclosure also provides a drive method of a pixel circuit, which is applied to the pixel circuit provided in any above-mentioned embodiment and the drive method includes following acts.

A reset sub-circuit resets a first node and a fourth node under control of signals of a reset control signal terminal and a scan signal terminal.

A writing sub-circuit writes a signal of a data signal terminal to a second node under control of a signal of the scan signal terminal.

A storage sub-circuit stores a voltage of the first node.

A coupling sub-circuit raises the voltage of the first node through a coupling action.

A drive sub-circuit provides a drive current to a light emitting element under control of signals of the first node and the second node.

In an exemplary embodiment, the drive method includes following acts.

In a reset stage, the reset sub-circuit resets the first node under control of a signal of the reset control signal terminal.

In a data writing stage, the writing sub-circuit writes a signal of the data signal terminal to the second node under control of a signal of the scan signal terminal; a compensation sub-circuit compensates a threshold voltage of the drive sub-circuit to the first node under control of a signal of the scan signal terminal; the storage sub-circuit stores a voltage of a control terminal of the drive sub-circuit.

In a light emitting stage, a first light emitting control sub-circuit forms a path between a first voltage terminal and the second node under control of a signal of a light emitting control signal terminal, the drive sub-circuit provides a drive current to a third node under control of signals of the first node and the second node, and a second light emitting control sub-circuit forms a path between the third node and a fourth node under control of a signal of the light emitting control signal terminal.

In a technical solution according to the embodiment of the present disclosure, a voltage of a first node (i.e., a control terminal of a drive sub-circuit) is increased through a coupling action of a coupling sub-circuit, and a drive current through a light emitting element is a relatively large value in an initial stage of light emitting, and gradually decreases to a normal value as a fourth node is charged to a predetermined voltage. When a load of the fourth node is larger and charging is slower (that is, a transparent trace is longer), the drive current is kept at a relatively large value for a longer time, which improves high-speed charging time, achieves charging self-compensation of an equivalent capacitance load of the light emitting element, and improves display uniformity of a display panel.

Following points need to be explained.

The drawings of the embodiments of the present disclosure only involve structures involved in the embodiments of the present disclosure, and other structures may refer to usual designs.

The embodiments in the present disclosure, i.e., features in the embodiments, may be combined with each other to obtain new embodiments if there is no conflict.

Although the implementation modes disclosed in the present disclosure are as above, the described contents are only implementation modes used for convenience of understanding the present disclosure and are not intended to limit the present disclosure. Any person skilled in the art to which the present disclosure pertains may make any modification and variation in forms and details of implementation without departing from the spirit and scope disclosed in the present disclosure. However, the scope of patent protection of the present disclosure is still subject to the scope defined in the appended claims.

The invention claimed is:

1. A pixel circuit, comprising a drive sub-circuit, a writing sub-circuit, a reset sub-circuit, a coupling sub-circuit, a storage sub-circuit, and a light emitting element, wherein the drive sub-circuit is configured to provide a drive current to the light emitting element under control of signals of a first node and a second node;

the writing sub-circuit is configured to write a signal of a data signal terminal to the second node under control of a signal of a scan signal terminal;

the storage sub-circuit is configured to store a voltage of the first node;

the coupling sub-circuit is configured to raise the voltage of the first node through a coupling action; and the reset sub-circuit is configured to reset an anode terminal of the light emitting element under control of a signal of the scan signal terminal and reset a control terminal of the drive sub-circuit under control of a signal of a reset control signal terminal, wherein the pixel circuit further comprises a compensation sub-circuit, a first light emitting control sub-circuit, and a second light emitting control sub-circuit, wherein the compensation sub-circuit is configured to compensate a threshold voltage of the drive sub-circuit under control of a signal of the scan signal terminal;

the first light emitting control sub-circuit is configured to form a path between a first voltage terminal and the second node under control of a signal of a light emitting control signal terminal;

the second light emitting control sub-circuit is configured to form a path between a third node and a fourth node under control of a signal of the light emitting control signal terminal; and one end of the light emitting element is connected with the fourth node, and the other end of the light emitting element is connected with a second voltage terminal.

2. The pixel circuit according to claim 1, wherein the storage sub-circuit comprises a first capacitor, and the coupling sub-circuit comprises a second capacitor;

one end of the first capacitor is connected with the first node, and the other end of the first capacitor is connected with the first voltage terminal;

one end of the second capacitor is connected with the first node, and the other end of the second capacitor is connected with the fourth node.

3. The pixel circuit according to claim 2, wherein the scan signal terminal comprises a first scan signal terminal, the drive sub-circuit comprises a third transistor, and the writing sub-circuit comprises a fourth transistor;

a control electrode of the third transistor is connected with the first node, a first electrode of the third transistor is connected with the second node, and a second electrode of the third transistor is connected with the third node; and a control electrode of the fourth transistor is connected with the first scan signal terminal, a first electrode of the fourth transistor is connected with the data signal terminal, and a second electrode of the fourth transistor is connected with the second node.

4. The pixel circuit according to claim 3, wherein the light emitting control signal terminal comprises a first light emitting control signal terminal, the reset control signal terminal comprises a first reset control signal terminal, the compensation sub-circuit comprises a second transistor, the first light emitting control sub-circuit comprises a fifth transistor, the second light emitting control sub-circuit comprises a sixth transistor, and the reset sub-circuit comprises a first transistor and a seventh transistor;

a control electrode of the second transistor is connected with the first scan signal terminal, a first electrode of the second transistor is connected with the third node, and a second electrode of the second transistor is connected with the first node;

a control electrode of the fifth transistor is connected with the first light emitting control signal terminal, a first electrode of the fifth transistor is connected with the first voltage terminal, and a second electrode of the fifth transistor is connected with the second node;

a control electrode of the sixth transistor is connected with the first light emitting control signal terminal, a first electrode of the sixth transistor is connected with the third node, and a second electrode of the sixth transistor is connected with the fourth node;

a control electrode of the first transistor is connected with the first reset control signal terminal, a first electrode of the first transistor is connected with the first node, and a second electrode of the first transistor is connected with a first initial signal terminal; and a control electrode of the seventh transistor is connected with the first scan signal terminal, a first electrode of the seventh transistor is connected with a second initial signal terminal, and a second electrode of the seventh transistor is connected with the fourth node.

5. A display apparatus, comprising a display panel and a photosensitive element, wherein the display panel comprises a first display region and a second display region, the first display region at least partially encloses the second display region, and the photosensitive element is located in the second display region;

the display panel further comprises multiple pixel circuits and multiple first light emitting elements located in the first display region; the multiple pixel circuits comprise: multiple first pixel circuits and multiple second pixel circuits, the multiple second pixel circuits are distributed among the multiple first pixel circuits, and at least one first pixel circuit in the multiple first pixel circuits is connected with at least one light emitting element in the multiple first light emitting elements;

the display panel further comprises multiple second light emitting elements located in the second display region; at least one second pixel circuit in the multiple second pixel circuits is connected with at least one light emitting element in the multiple second light emitting elements; and the second pixel circuit is the pixel circuit according to claim 2.

6. A drive method of a pixel circuit, which is used for driving the pixel circuit according to claim 2, wherein the drive method comprises:

resetting, by a reset sub-circuit, a first node and a fourth node under control of signals of a reset control signal terminal and a scan signal terminal;

writing, by a writing sub-circuit, a signal of a data signal terminal to a second node under control of a signal of the scan signal terminal;

storing, by a storage sub-circuit, a voltage of the first node;

raising, by a coupling sub-circuit, the voltage of the first node through a coupling action; and providing, by a drive sub-circuit, a drive current to a light emitting element under control of signals of the first node and the second node.

7. The pixel circuit according to claim 3, wherein the third transistor is a P-type thin film transistor and the fourth transistor is a P-type thin film transistor or an N-type thin film transistor.

8. The pixel circuit according to claim 3, wherein the scan signal terminal further comprises a second scan signal terminal, the light emitting control signal terminal comprises a first light emitting control signal terminal, the reset control signal terminal comprises a first reset control signal terminal, the compensation sub-circuit comprises a second transistor, the first light emitting control sub-circuit comprises a fifth transistor, the second light emitting control sub-circuit comprises a sixth transistor, and the reset sub-circuit comprises a first transistor, a seventh transistor, and an eighth transistor;

a control electrode of the second transistor is connected with the first scan signal terminal, a first electrode of the second transistor is connected with the third node, and a second electrode of the second transistor is connected with a fifth node;

a control electrode of the fifth transistor is connected with the first light emitting control signal terminal, a first electrode of the fifth transistor is connected with the first voltage terminal, and a second electrode of the fifth transistor is connected with the second node;

a control electrode of the sixth transistor is connected with the first light emitting control signal terminal, a first electrode of the sixth transistor is connected with the third node, and a second electrode of the sixth transistor is connected with the fourth node;

a control electrode of the first transistor is connected with the first reset control signal terminal, a first electrode of the first transistor is connected with the fifth node, and a second electrode of the first transistor is connected with a first initial signal terminal;

a control electrode of the seventh transistor is connected with the first scan signal terminal, a first electrode of the seventh transistor is connected with a second initial signal terminal, and a second electrode of the seventh transistor is connected with the fourth node; and a control electrode of the eighth transistor is connected with the second scan signal terminal, a first electrode of the eighth transistor is connected with the fifth node, and a second electrode of the eighth transistor is connected with the first node.

9. The pixel circuit according to claim 8, wherein the first transistor to the seventh transistor are all P-type thin film transistors, and the eighth transistor is an N-type thin film transistor.

10. A drive method of a pixel circuit, which is used for driving the pixel circuit according to claim 3, wherein the drive method comprises:

resetting, by a reset sub-circuit, a first node and a fourth node under control of signals of a reset control signal terminal and a scan signal terminal;

writing, by a writing sub-circuit, a signal of a data signal terminal to a second node under control of a signal of the scan signal terminal;

storing, by a storage sub-circuit, a voltage of the first node;

raising, by a coupling sub-circuit, the voltage of the first node through a coupling action; and providing, by a drive sub-circuit, a drive current to a light emitting element under control of signals of the first node and the second node.

11. The pixel circuit according to claim 1, wherein the storage sub-circuit comprises a first capacitor, and the coupling sub-circuit comprises a second capacitor;

one end of the first capacitor is connected with the first node, and the other end of the first capacitor is connected with the third node; and one end of the second capacitor is connected with the first node, and the other end of the second capacitor is connected with the first voltage terminal.

12. The pixel circuit according to claim 11, wherein the scan signal terminal comprises a second scan signal terminal, the light emitting control signal terminal comprises a second light emitting control signal terminal, the reset control signal terminal comprises a second reset control signal terminal, the compensation sub-circuit comprises a second transistor, the drive sub-circuit comprises a third transistor, the writing sub-circuit comprises a fourth transistor, the first light emitting control sub-circuit comprises a fifth transistor, the second light emitting control sub-circuit comprises a sixth transistor, and the reset sub-circuit comprises a first transistor and a seventh transistor;

a control electrode of the second transistor is connected with the second scan signal terminal, a first electrode of the second transistor is connected with the third node, and a second electrode of the second transistor is connected with the first node; a control electrode of the third transistor is connected with the first node, a first electrode of the third transistor is connected with the second node, and a second electrode of the third transistor is connected with the third node; a control electrode of the fourth transistor is connected with the second scan signal terminal, a first electrode of the fourth transistor is connected with the data signal terminal, and a second electrode of the fourth transistor is connected with the second node; a control electrode of the fifth transistor is connected with the second light emitting control signal terminal, a first electrode of the fifth transistor is connected with the first voltage terminal, and a second electrode of the fifth transistor is connected with the second node; a control electrode of the sixth transistor is connected with the second light emitting control signal terminal, a first electrode of the sixth transistor is connected with the third node, and a second electrode of the sixth transistor is connected with the fourth node; a control electrode of the first transistor is connected with the second reset control signal terminal, a first electrode of the first transistor is connected with the first node, and a second electrode of the first transistor is connected with a first initial signal terminal; a control electrode of the seventh transistor is connected with the second scan signal terminal, a first electrode of the seventh transistor is connected with a second initial signal terminal, and a second electrode of the seventh transistor is connected with the fourth node.

13. The pixel circuit according to claim 12, wherein the third transistor is an N-type thin film transistor, the first transistor is a P-type thin film transistor or an N-type thin film transistor, the second transistor is a P-type thin film transistor or an N-type thin film transistor, the fourth transistor is a P-type thin film transistor or an N-type thin film transistor, the fifth transistor is a P-type thin film transistor or an N-type thin film transistor, the sixth transistor is a P-type thin film transistor or an N-type thin film transistor, and the seventh transistor is a P-type thin film transistor or an N-type thin film transistor.

14. A display panel, comprising multiple sub-pixels, wherein at least one of the sub-pixels comprises the pixel circuit according to claim 1.

15. The display panel according to claim 14, wherein the display panel comprises a first display region and a second display region, the first display region at least partially encloses the second display region;

the display panel further comprises multiple pixel circuits and multiple first light emitting elements located in the first display region; the multiple pixel circuits comprise multiple first pixel circuits and multiple second pixel circuits, the multiple second pixel circuits are distributed among the multiple first pixel circuits; at least one first pixel circuit in the multiple first pixel circuits is connected with at least one light emitting element in the multiple first light emitting elements;

the display panel further comprises multiple second light emitting elements located in the second display region; at least one second pixel circuit in the multiple second pixel circuits is connected with at least one light emitting element in the multiple second light emitting elements; and the second pixel circuit comprises a drive sub-circuit, a writing sub-circuit, a reset sub-circuit, a coupling sub-circuit, a storage sub-circuit, and a light emitting element, wherein the drive sub-circuit is configured to provide a drive current to the light emitting element under control of signals of a first node and a second node;

the writing sub-circuit is configured to write a signal of a data signal terminal to the second node under control of a signal of a scan signal terminal;

the storage sub-circuit is configured to store a voltage of the first node;

the coupling sub-circuit is configured to raise the voltage of the first node through a coupling action; and the reset sub-circuit is configured to reset an anode terminal of the light emitting element under control of a signal of the scan signal terminal and reset a control terminal of the drive sub-circuit under control of a signal of a reset control signal terminal.

16. The display panel according to claim 15, wherein the first pixel circuit comprises a drive sub-circuit, a writing sub-circuit, a reset sub-circuit, a coupling sub-circuit, a storage sub-circuit, and a light emitting element, wherein the drive sub-circuit is configured to provide a drive current to the light emitting element under control of signals of a first node and a second node;

the writing sub-circuit is configured to write a signal of a data signal terminal to the second node under control of a signal of a scan signal terminal;

the storage sub-circuit is configured to store a voltage of the first node;

the coupling sub-circuit is configured to raise the voltage of the first node through a coupling action; and the reset sub-circuit is configured to reset an anode terminal of the light emitting element under control of a signal of the scan signal terminal and reset a control terminal of the drive sub-circuit under control of a signal of a reset control signal terminal.

17. A drive method of a pixel circuit, which is used for driving the pixel circuit according to claim 1, wherein the drive method comprises:

resetting, by a reset sub-circuit, a first node and a fourth node under control of signals of a reset control signal terminal and a scan signal terminal;

writing, by a writing sub-circuit, a signal of a data signal terminal to a second node under control of a signal of the scan signal terminal;

storing, by a storage sub-circuit, a voltage of the first node;

raising, by a coupling sub-circuit, the voltage of the first node through a coupling action; and providing, by a drive sub-circuit, a drive current to a light emitting element under control of signals of the first node and the second node.

18. A display apparatus, comprising a display panel and a photosensitive element, wherein the display panel comprises a first display region and a second display region, the first display region at least partially encloses the second display region, and the photosensitive element is located in the second display region;

the display panel further comprises multiple pixel circuits and multiple first light emitting elements located in the first display region; the multiple pixel circuits comprise: multiple first pixel circuits and multiple second pixel circuits, the multiple second pixel circuits are distributed among the multiple first pixel circuits, and at least one first pixel circuit in the multiple first pixel circuits is connected with at least one light emitting element in the multiple first light emitting elements;

the display panel further comprises multiple second light emitting elements located in the second display region; at least one second pixel circuit in the multiple second pixel circuits is connected with at least one light emitting element in the multiple second light emitting elements; and the second pixel circuit is the pixel circuit according to claim 1.

19. A display panel, comprising multiple sub-pixels, wherein at least one of the sub-pixels comprises the pixel circuit according to claim 1.

* * * * *